No. 627,882. Patented June 27, 1899.
G. R. SHERWOOD.
MACHINE FOR PITHING STALKS.
(Application filed Apr. 3, 1899.)
(No Model.) 6 Sheets—Sheet 1.

WITNESSES:

INVENTOR
George R. Sherwood.
BY Munn & Co.
ATTORNEYS.

No. 627,882. Patented June 27, 1899.
G. R. SHERWOOD.
MACHINE FOR PITHING STALKS.
(Application filed Apr. 3, 1899.)
(No Model.) 6 Sheets—Sheet 2.

WITNESSES:

INVENTOR
George R. Sherwood
BY
ATTORNEYS.

No. 627,882. Patented June 27, 1899.
G. R. SHERWOOD.
MACHINE FOR PITHING STALKS.
(Application filed Apr. 3, 1899.)
(No Model.) 6 Sheets—Sheet 3.
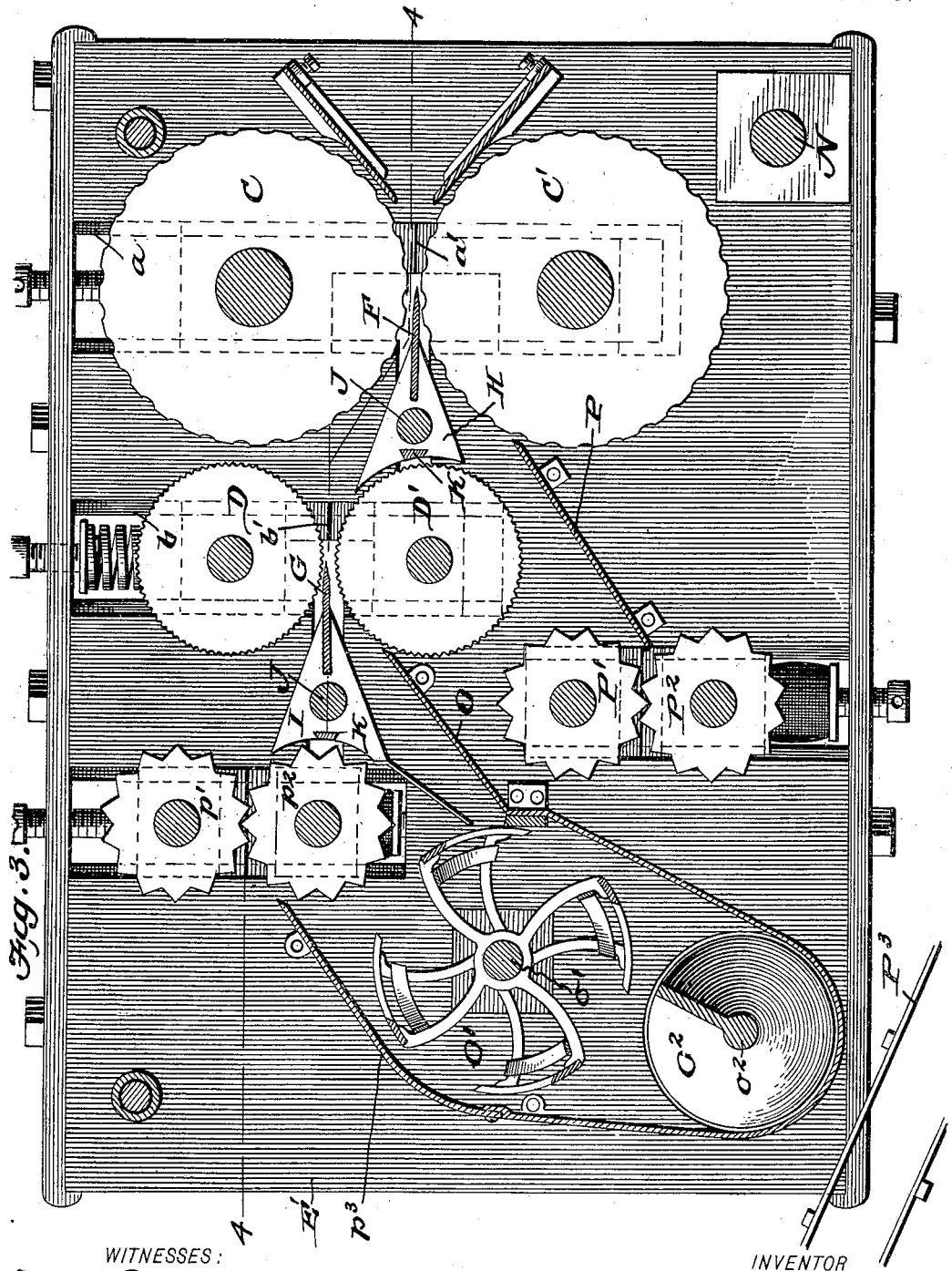
WITNESSES:
INVENTOR
George R. Sherwood.
BY
ATTORNEYS

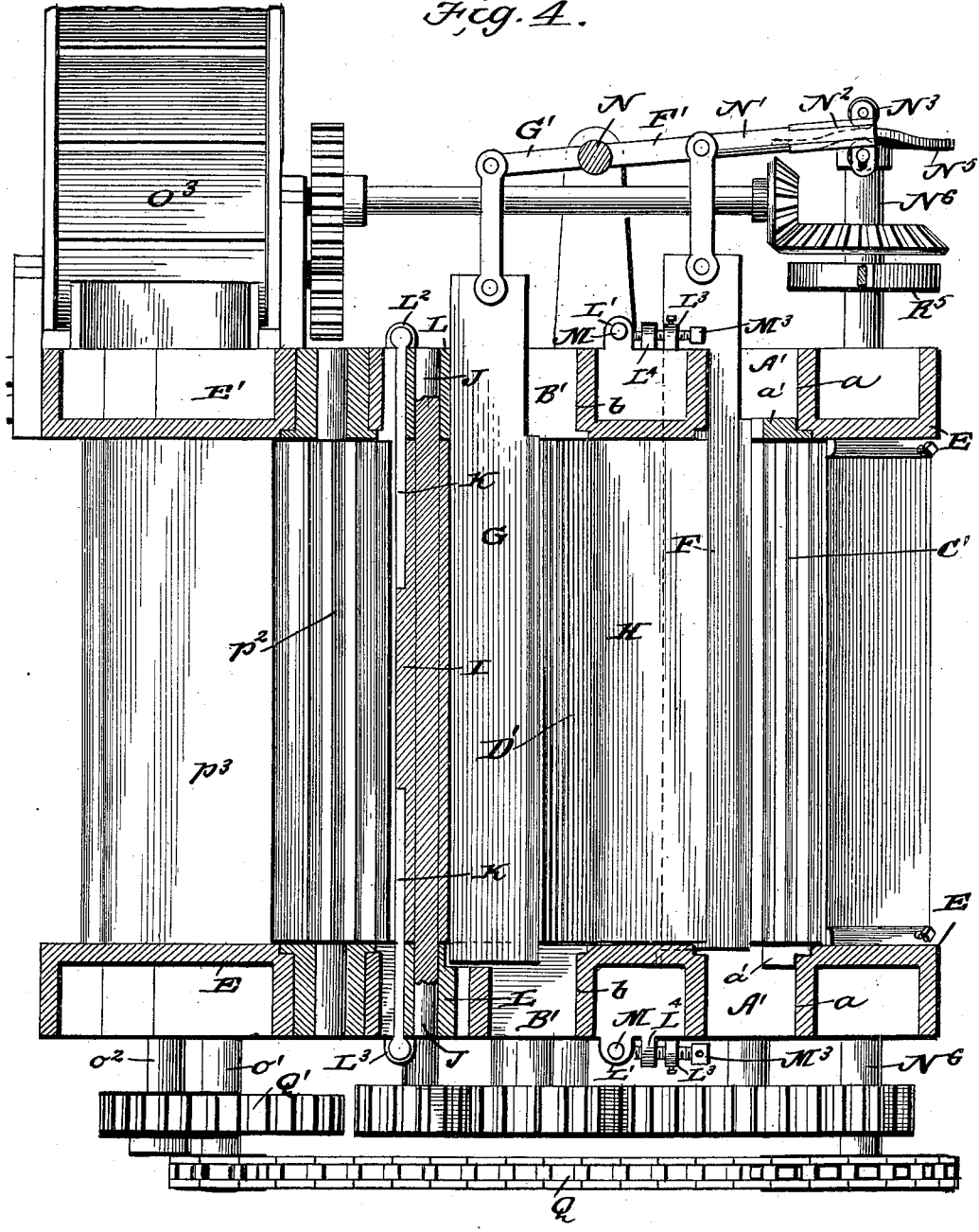

No. 627,882. Patented June 27, 1899.
G. R. SHERWOOD.
MACHINE FOR PITHING STALKS.
(Application filed Apr. 3, 1899.)
(No Model.) 6 Sheets—Sheet 5.
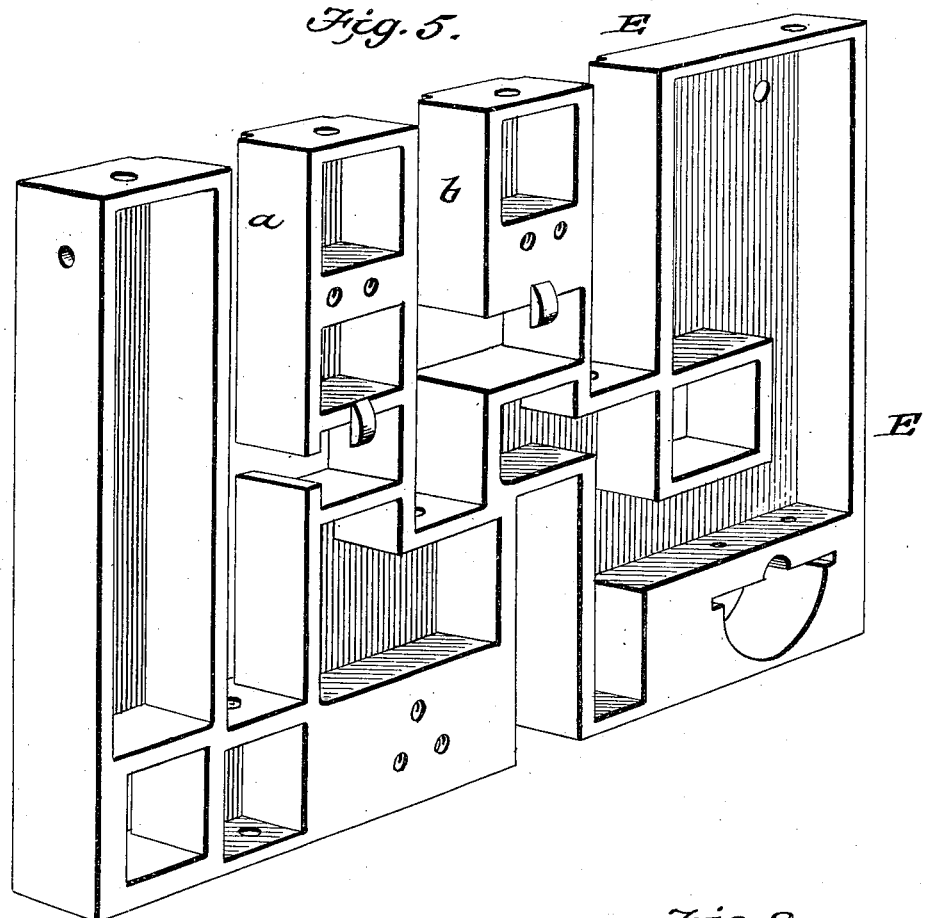
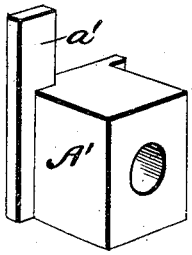
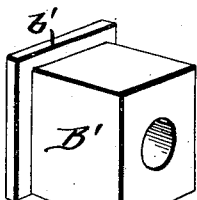
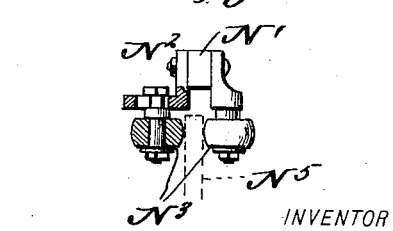
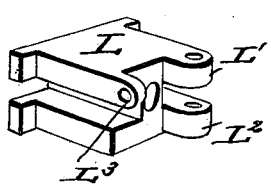
WITNESSES: INVENTOR
George R. Sherwood.
BY
ATTORNEYS.

No. 627,882. Patented June 27, 1899.
G. R. SHERWOOD.
MACHINE FOR PITHING STALKS.
(Application filed Apr. 3, 1899.)
(No Model.) 6 Sheets—Sheet 6.
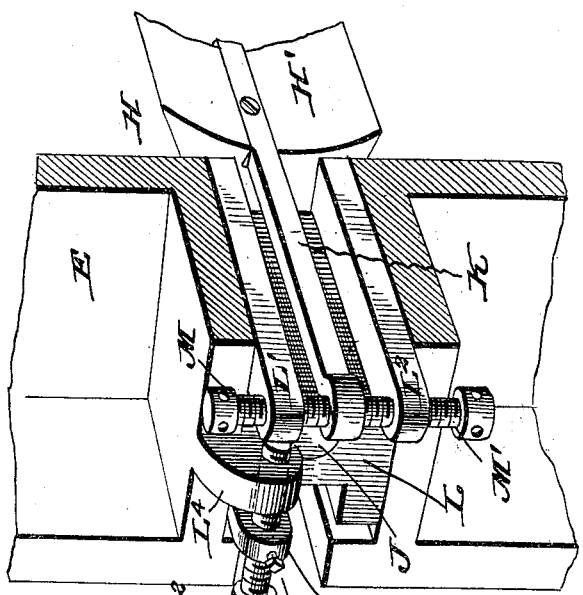
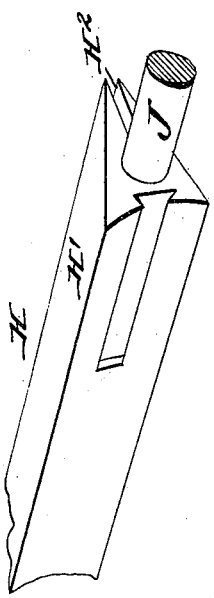
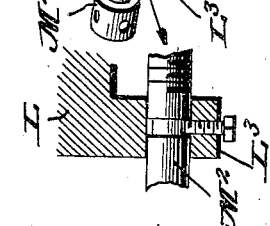
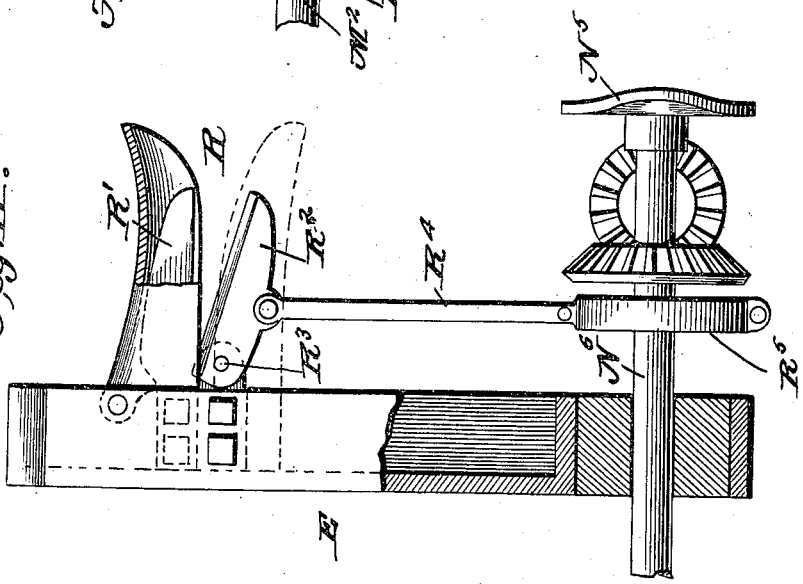
WITNESSES:
INVENTOR
George R. Sherwood.
BY
ATTORNEYS.
THE NORRIS PETERS CO., PHOTO-LITHO., WASHINGTON, D. C.

UNITED STATES PATENT OFFICE.

GEORGE R. SHERWOOD, OF KEARNEY, NEBRASKA.

MACHINE FOR PITHING STALKS.

SPECIFICATION forming part of Letters Patent No. 627,882, dated June 27, 1899.

Application filed April 3, 1899. Serial No. 711,567. (No model.)

*To all whom it may concern:*

Be it known that I, GEORGE R. SHERWOOD, residing at Kearney, in the county of Buffalo and State of Nebraska, have made certain new and useful Improvements in Machines for Pithing Stalks, of which the following is a specification.

My invention is an improvement in machines for separating the pith and the shell or casing of pith-bearing stalks, or, in other words, it is a machine for pithing stalks, whereby the stalk may be divided into pith and shell, so each of such portions may be used for its purpose without being affected by the other portion.

In my present machine I provide means whereby I remove the shell from one side of the stalk flattened by the feed-rolls and then remove the shell from the opposite side of such stalk, so the intermediate pith portion may be discharged after the shell or casing is removed. In such operation I remove the shell from the opposite sides of the stalk successively, so the pith as it passes from the first to the second cutter will be supported by the shell on one side of the stalk.

The invention consists in certain novel constructions and combinations of parts, as will be hereinafter described, and pointed out in the claims.

Figure 1:
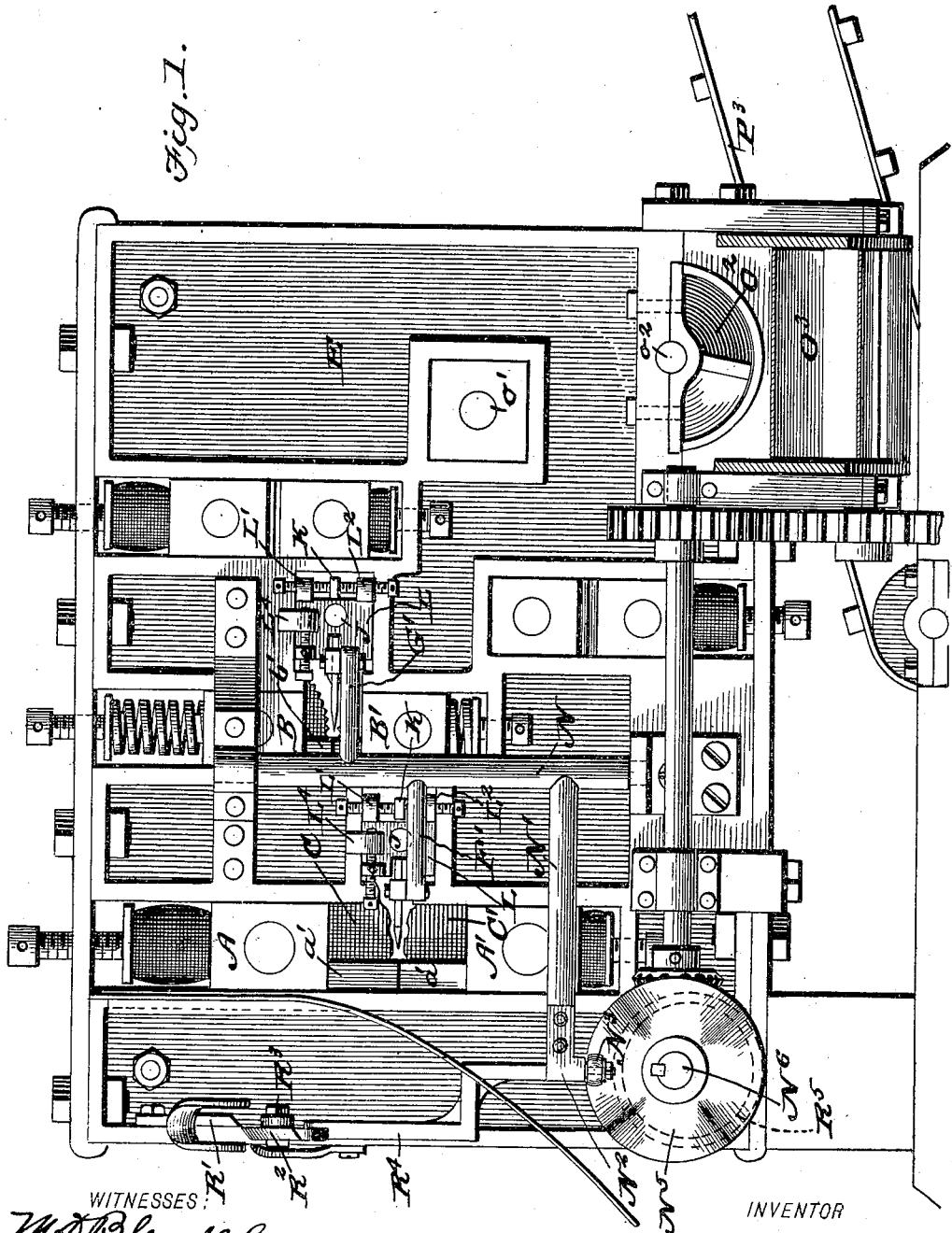
Figure 2:
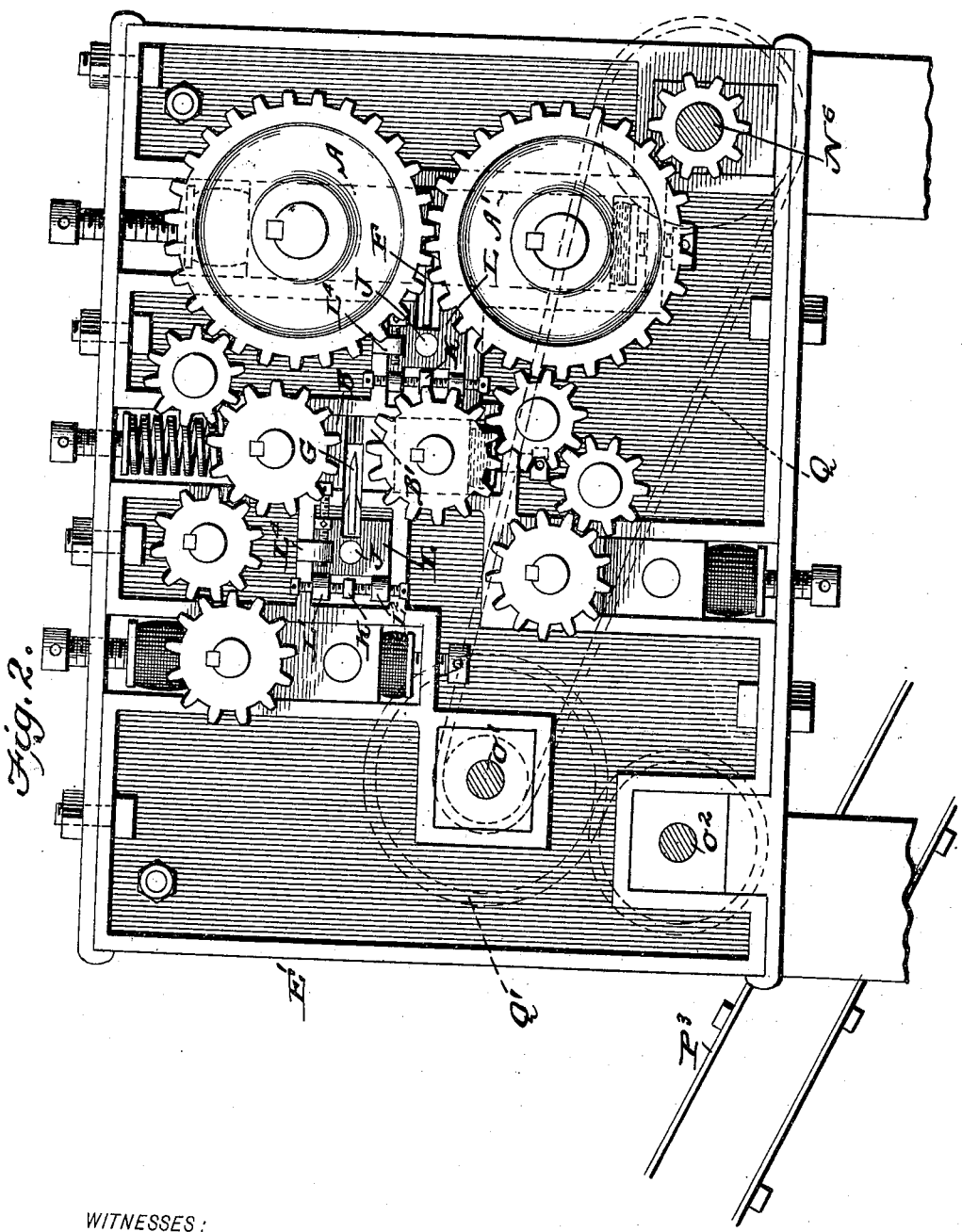

In the drawings, Figure 1 is a side view of the machine, and Fig. 2 is a view of the opposite side. Fig. 3 is a vertical longitudinal section of the machine. Fig. 4 is a horizontal section on about line 4 4 of Fig. 3. Fig. 5 is a detail perspective view of the outer side of the side frame shown in Fig. 1. Figs. 6 and 7 are detail views of certain of the boxes. Fig. 8 is a detail perspective view of one of the boxes for supporting the cutter and its carrier. Figs. 9 and 10 are detail views of a portion of the rock-shaft which operates the cutters. Fig. 11 is a detail elevation, partly in section, of the butt-cutter for removing the roots on the stalks. Fig. 12 is a detail perspective view illustrating the means for supporting and adjusting the carrier for the cutter. Fig. 13 is a detail perspective view of a portion of one of the carriers for the cutters, and Fig. 14 is a detail sectional view.

In carrying out my invention I provide a suitable framing, which is of a special construction, as will be described, and in which I support boxes A A' B B', in which are journaled the feed-rolls C C' and D D', the rolls D D' being arranged in rear of the rolls C C' and preferably with their contacting surfaces above those of the rolls C C', as is best shown in Fig. 3. By preference the surfaces of the feed-rolls are corrugated longitudinally, as shown.

The boxes A A' and B B' are supported, respectively, in the channels $a$ and $b$ of the side frames E E' and are provided with bearings for the journals of the rolls. At their inner edges the boxes have flanges, which overlap the side frames and guide the boxes, and at their adjacent edges the boxes of each pair A A' and B B' are provided with lugs $a'$ and $b'$, which abut and limit the adjustment of the rolls toward each other. The rolls A A' and B B' may be adjusted toward each other by means of the screws, as shown, being yieldingly held in such adjustment by the springs which support their boxes. Manifestly this adjustment of the rolls and their yielding action may be secured in various ways, and I do not desire to be limited to any special means for securing such results.

Immediately in rear of the rolls C C' and D D', I arrange the cutters F and G, whose cutting edges are located usually at or just in rear of the immediately-opposing faces of their rolls, so the cutters will cut the shell from the stalk before the latter has an opportunity to expand after compression by the rolls, as in practice the rolls operate to flatten out the stalks, so the first cutter may cut the shell from the under side of the stalk and discharge the same, while the body of the pith and the shell at the opposite side will pass onto the next cutter. In securing this result I arrange one cutter to one side of the center of the space between its feed-rolls, which space constitutes the feedway for the stalks passing to such cutter, so it will split the shell from one side of the stalk, and the cutter following at the opposite side of the center of the space between its feed-rolls, so it will remove the pith from the opposite side of the stalk, leaving the pith free.

I also provide means for adjusting the cutters F and G forward and back and also for tilting such cutters to raise and lower their cutting edges. These results are desirable in securing the proper adjustment of the cutters to cut stalks of different sizes and those in different conditions, especially to adapt the machine to cut very dry stalks or damp wet stalks, and thus permit the adjustment of the same machine to operate in very dry or very damp sections. To this end I prefer to support the cutters in carriers H and I, and it is preferred to make such carriers in the tapered form best shown in Fig. 3. These carriers H and I are made alike, so that a description of one will answer for both. The carrier H is formed with a cast-iron body H', in which is cast the wrought-iron or steel shaft J, whose ends are extended to form the journals, which rest in the supporting-box. The body H' is triangular or wedge-shaped in cross-section and has at its apex or pointed front edge the longitudinal groove $H^2$, which forms a channel for the cutter F, which may be reciprocated back and forth in the said channel by the mechanism presently described. The shaft J is arranged between the front and rear edge of the body H', and to the rear edge of said body I secure an arm K, which extends laterally, as shown in Fig. 12, through the adjacent side frame and has its outer edge arranged to be adjusted by the mechanism shown in such manner as to tilt the carrier on its shaft J. This shaft J journals in the box L, so it may rock to tilt the carrier to set the cutting edge of the cutter up or down, as may be desired, and means are provided between the laterally-extending bar K and the box L whereby said bar, and with it the rear end of the carrier H, may be adjusted up or down. This mechanism preferably includes screw devices operating between the box L and the bar K. As shown in Fig. 12 and in detail in Fig. 8, the box L is provided with upper and lower lugs L' and $L^2$, which have threaded openings, between which lies the outer end of the bar K. Screws M M' turn in the threaded openings of the lugs L' and $L^2$ and engage the outer end of the bar K, so that by adjusting the screws M and M' the said bar K can be set up or down to any desired adjustment and secured in said adjustment, as will be understood from Fig. 12.

In adjusting the cutter forward and back I prefer to do so by setting the carrier and the boxes in which the same is supported forward and back by means of the bolts $M^2$, which journal in lugs $L^3$ on the boxes L and thread in the lugs $L^4$, projecting laterally from the side frames. As will be best understood from Fig. 12, the turning of the bolts $M^2$ will set the boxes forward and back in order to adjust the cutters to and from their feed-rolls. It will be noticed that the tilting of the cutters and the adjustment thereof forward and back are accomplished independently and by adjusting the carrier in its supporting-boxes and setting such boxes to the front or rear, as may be required. It will also be noticed that these adjusting devices are on the outside of the machine, convenient of access, and can be operated instantly to vary the adjustment of the cutters in any way desired. The cutters F and G are reciprocated in operation by means of the arms F' and G' on a rock-shaft N, which shaft also has an arm N', whose end $N^2$ is forked and is provided with the rollers $N^3$, bearing on opposite sides of a waved or cam wheel $N^5$ on a shaft $N^6$. As the cam $N^5$ is revolved it will throw the arm N' from side to side, rocking the rock-shaft N rapidly and causing the arms F' and G' to reciprocate their respective cutters F and G.

By the described construction it will be seen the stalks will be fed between the rolls C C' and acted on while flattened by said rolls by the cutter F, which will strip the shell from the lower side of the stalk, permitting the pith, with the upper side of the shell, to pass on up the body H of the carrier to the feed-rolls D and D', which feed the pith and upper shell to the cutter G, which will remove the upper shell of the stalk, freeing the pith, which will be discharged down a guide-board O to a rotary cutter O', which is rapidly revolved and has blades which divide the pith to any desired degree and discharge it to the screw conveyer $O^2$, by which it is carried to one side of the machine and delivered to a carrier $O^3$, by which the pith may be discharged at any desired point. The cutter O' is supported in suitable boxes and is geared with the other parts of the machine, so it will be rapidly revolved in operation.

While I have shown the cutters F and G as arranged for cutting the shell respectively from the lower and upper sides of the stalk, it is manifest such arrangement might be reversed and the front cutter cut the shell from the upper side and the succeeding cutter that from the lower side of the stalk without departing from my invention; but it is preferred to employ the arrangement shown, as thereby better facilities are afforded for disposing of the pith.

The shell of the stalk removed by the cutter F passes down a guide-board P to breaking-rolls P' and $P^2$, which properly break it up and deliver it to the carrier $P^3$, while the shell removed by the cutter G is passed between the breaking-rolls $p'$ and $p^2$ and is discharged over the casing $p^3$, which incloses the cutter O' and the shaft $O^2$. The shafts $o'$ and $o^2$ of the cutter and conveyer journal in suitable boxes and may be driven in any desired manner. As shown, the shaft $o'$ is driven by a belt Q from a sprocket-wheel on the shaft $N^6$, and a gear-wheel Q' on the shaft $o'$ meshes with a pinion on the shaft $o^2$ for driving the conveyer. The several rolls for feeding the stalk and crushing the shell removed therefrom may be geared together by the arrangement of gearing shown in Fig. 2 and driven from the shaft N⁶, or the said rolls may be driven by any other suitable mechanism.

The carrier O³ is driven by the gearing best shown in Fig. 4 with the drive-shaft N⁶.

Alongside the feed end of the machine I provide the butt-cutter R, (shown in Fig. 1 and in detail in Fig. 11,) which includes the upper and lower shearing-blades R' and R², suitably housed to avoid danger to the operator, the lower blade R² being pivoted at R³ and operated by a pitman R⁴ by the eccentric R⁵ on the shaft N⁶. As this shaft N⁶ revolves the eccentric R⁵ will reciprocate the pitman R⁴, thus operating the blade R² to cut off the butts or root ends of any stalks that may be inserted between the blades. I have only shown this butt-cutter at one side of the machine, but manifestly one may be arranged at each side, and the said butt-cutters may be of any desired construction and suitably connected with the machine for operation, as may be desired.

It will be noticed in Fig. 1 that the cutters F and G extend at one end through the side frame, so they can be conveniently removed for sharpening or other purposes.

In the operation of my machine the stalk is fed between the feed-rolls C C', is flattened thereby, and fed to the cutter F, which removes the shell from the lower side of the stalk, the remainder of the shell and the body of the pith passing on to the cutter G, the shell aiding in feeding the stalk to the roller D D', as will be readily understood.

It is evident from the foregoing that I reduce the stalks practically to a size by the flattening process of the feed-rolls before subjecting them to the action of the cutters.

Having thus described my invention, what I claim as new, and desire to secure by Letters Patent, is—

1. In a machine for pithing stalks the combination of the framing, devices for flattening the stalks, feedways for the stalks, a cutter for cutting the shell from one side of the stalk and a succeeding cutter for cutting the shell from the opposite side of the stalk such cutters being arranged to one side of the center of their respective feedways substantially as set forth.

2. In a machine for pithing stalks the combination with the framing and devices for flattening the stalks in advance of the action of the cutting mechanism, of cutting mechanism arranged to remove the shell or casing successively from the opposite sides of the stalks substantially as set forth.

3. In a machine for pithing stalks, the combination of the framing, devices for flattening the stalks, a cutter arranged to strip the shell from one side of the stalks and a cutter arranged in rear of said first cutter by which to remove the shell from the other side of the stalks substantially as set forth.

4. A machine for pithing stalks provided with means for flattening the stalks and with knives or cutters arranged one in rear of the other and in different planes and arranged to strip the shell or casing from opposite sides of the stalks substantially as set forth.

5. In a machine for pithing stalks, the combination of the front pair of feeding-rolls, the rear pair of feeding-rolls, and cutters arranged in line with the space between their respective feeding-rolls and to one side of the center of such space, such cutters being arranged alternately or one near one side and the other near the opposite side of the spaces between their respective feed-rollers, whereby the shell of the stalk will be stripped alternately from the opposite sides of same substantially as set forth.

6. In a machine for pithing stalks the combination of the pairs of feeding-rolls arranged one pair in rear of the other and adapted to flatten the stalks, the cutters located in line with the spaces between their respective pairs of rollers, and means for adjusting said cutters to set their edges up or down relatively to their respective pairs of feed-rolls substantially as set forth.

7. In a machine for pithing stalks, the combination of the pairs of feeding-rolls arranged one pair in rear of the other and set to flatten the stalks, the cutters located in line with the spaces between their respective rolls and devices for adjusting said cutters forward and back whereby to accommodate the same to the size and condition of the stalks being treated, substantially as set forth.

8. In a machine for pithing stalks the combination of the devices for flattening the stalks, the cutter, the carrier therefor having projecting shafts at its ends, the boxes supporting said shaft, means coöperating with the boxes whereby to adjust the carrier to set the edge of the cutter up or down, the framing supporting said boxes, and devices for adjusting the boxes back and forth in the framing substantially as set forth.

9. The combination with the framing the feeding devices, the cutter, the carrier therefor having end journals and a bar eccentric to said journals, the box supported in the framing and having bearings for the journals of the cutter-carrier, and lugs arranged opposite the said eccentric bar of the carrier, screw devices between said lugs and bar for tilting the carrier, and screws for adjusting the boxes back and forth in the framing substantially as set forth.

10. In a machine for pithing stalks, the combination with the feeding-rolls arranged and adapted to flatten the stalks, of the cutter arranged in line with the space between said rolls and near one side of said space whereby to cut the shell from one side of the stalks flattened by the said rolls substantially as set forth.

11. A machine for pithing stalks comprising successive feed-rolls arranged to flatten the stalks, and cutters arranged in rear of the successive stalk-flattening rolls and set one near the upper and the other near the lower sides of the space between such rolls whereby to successively remove the shell of the stalks from the opposite sides of same substantially as set forth.

12. In a machine for pithing stalks the combination of feed-rolls arranged and adapted to flatten the stalks and cutters arranged to remove the shell or casing from the opposite side of the stalk substantially as set forth.

13. In a machine for pithing stalks the combination of devices by which to flatten the stalks and devices for removing the shell or casing from the opposite sides of the stalks substantially as set forth.

14. The combination with stalk-flattening devices arranged one in rear of the other, of cutters arranged in rear of their respective stalk-flattening devices and adapted to remove the shell or casing from the opposite sides of the stalks while flattened substantially as set forth.

15. In a machine for pithing stalks the combination of the front pair of feeding-rolls, the rear pair of feeding-rolls, such rolls being set to flatten the stalks, the cutters arranged in rear of their respective rolls, and the carriers for said cutters tapering rearwardly from the cutters substantially as set forth.

GEORGE R. SHERWOOD.

Witnesses:
SOLON C. KEMON,
PERRY B. TURPIN.